United States Patent

[11] 3,582,163

| [72] | Inventor | Lewis W. McKee |
| | | Brookfield, Conn. |
| [21] | Appl. No. | 805,674 |
| [22] | Filed | Mar. 10, 1969 |
| [45] | Patented | June 1, 1971 |
| [73] | Assignee | The Barden Corporation |
| | | Donbury, Conn. |

[54] ANTI-LUBRICANT CREEP BALL BEARING
3 Claims, 2 Drawing Figs.
[52] U.S. Cl. .................................................. 308/187
[51] Int. Cl. ..................................................... F16c 33/66
[50] Field of Search .......................................... 308/159,
187, 193; 58/140; 184/1

[56] References Cited
UNITED STATES PATENTS

| 3,081,644 | 3/1963 | Hudgens et al. | 308/N |
| 3,198,735 | 8/1965 | Lamson et al. | 308/187 |
| 3,225,866 | 12/1965 | Bernett et al. | 58/140X |
| 3,292,980 | 12/1966 | Gustafsson | 308/193 |
| 3,080,703 | 3/1963 | Body | 308/159 |

*Primary Examiner*—Fred C. Mattern, Jr.
*Assistant Examiner*—Frank Susko
*Attorney*—Schenier & O'Connor ABSTRACT: A ball bearing in which thin films of tetrafluoroethylene extend around the lands of the bearing rings from a location adjacent the edges of the ball grooves to the end faces of the rings and radially for a distance along the end faces to inhibit the flow of lubricant from the grooves along the surfaces of the lands and faces.

PATENTED JUN 1 1971 3,582,163

INVENTOR
Lewis W. McKee
BY
Shenier & O'Connor
ATTORNEYS

ANTI-LUBRICANT CREEP BALL BEARING

BACKGROUND OF THE INVENTION

Most ball bearings of the prior art comprise metal inner and outer ball rings having grooves which receive the balls of the bearing. These grooves provide lands leading from the grooves to the end faces of the rings. The most commonly employed method of lubricating these bearings of the prior art is the application of oil or another liquid lubricant to the bearing grooves. While this is a generally satisfactory and most economical method of lubricating the bearings, it creates a number of problems. Owing to the fact that the lubricant wets the surfaces of the lands as well as groove surfaces, it tends to creep axially out of the grooves and then radially along the end faces of the rings. This action produces two undesirable results. First, there is a loss of useful lubricant which results either in insufficient lubrication or in the requirement for replenishing the lubricant in the grooves at relatively frequent intervals. Secondly, the presence of the lubricant on the lands and the end faces tends to collect dirt which may clog the bearing or parts associated therewith.

I have invented a ball bearing which overcomes the defects of structures of the prior art pointed out hereinabove. My bearing inhibits the escape of liquid lubricant from the bearing grooves. It does not require as frequent replenishment of the supply of lubricant in the grooves as do bearings of the prior art. My bearing is cleaner and has less tendency to collect dirt and dust than assemblies of the prior art.

SUMMARY OF THE INVENTION

One object of my invention is to provide an antilubricant creep bearing which inhibits the escape of liquid lubricant from the bearing grooves.

Another object of my invention is to provide an antilubricant creep bearing which does not require as frequent lubricant replenishment as do bearing assemblies of the prior art.

A further object of my invention is to provide an antilubricant creep bearing which is cleaner than bearing assemblies of the prior art.

Still another object of my invention is to provide an antilubricant creep bearing which does not have the tendency to collect dirt which is present in bearing assemblies of the prior art.

Other and further objects of my invention will appear from the following description.

In general my invention contemplates the provision of a ball bearing having inner and outer rings each of which is provided with a ball groove or raceway between lands which extend from the raceway to the end faces of the ring. I apply thin films of nonstick low surface tension material such as tetrafluoroethylene resin around each of the lands from a location adjacent the edges of the ball groove to the end faces and thence radially along the end faces so that liquid lubricant which will not wet the film has no tendency to creep outwardly of the bearing.

BRIEF DESCRIPTION OF THE DRAWINGS

In the accompanying drawings which form part of the instant specification and which are to be read in conjunction therewith and in which like reference numerals are used to indicate like parts in the various views.

DESCRIPTION OF THE PREFERRED EMBODIMENT

Figure 2:
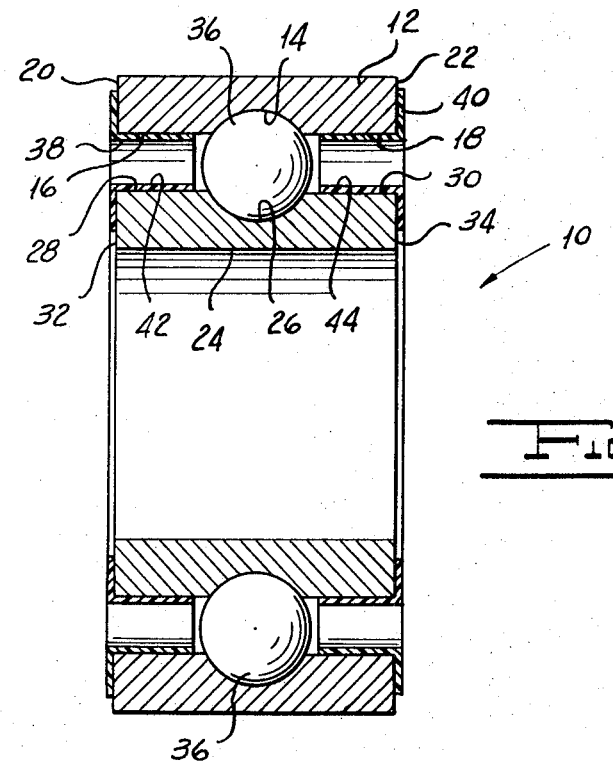
FIG. 2 is a sectional view of my antilubricant creep bearing taken along the line 2—2 of FIG. 1.
Figure 1:
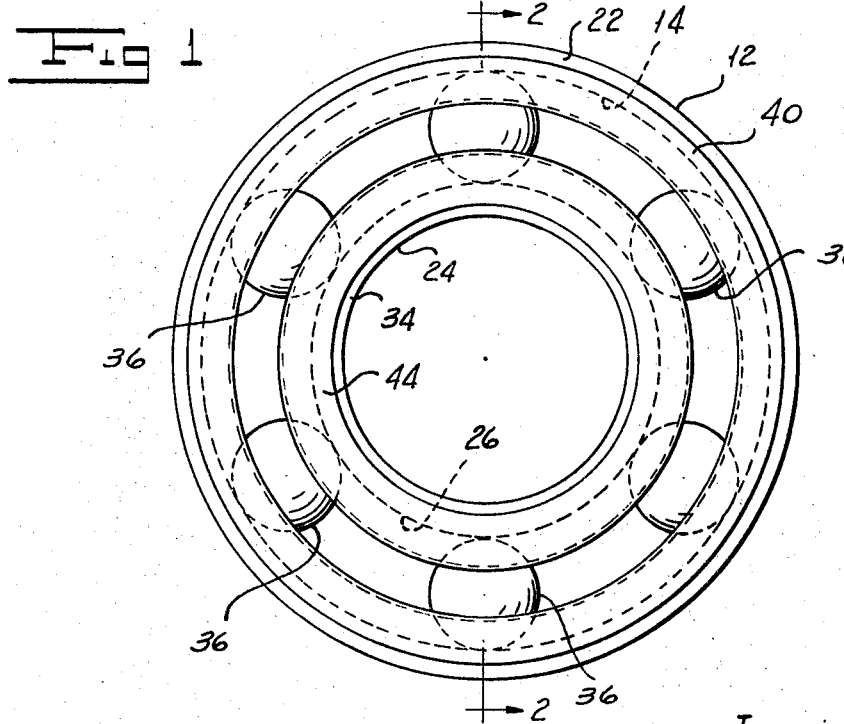
FIG. 1 is a plan view of my antilubricant creep bearing.

Referring now to the drawings, my lubricant anticreep bearing indicated generally by the reference character 10 includes an outer ring 12 formed of any suitable material such for example as steel or the like. I provide ring 12 with a groove or raceway 14 and with respective lands 16 and 18 extending axially from the groove 14 to the end faces 20 and 22 of the ring 12.

Bearing 10 further includes an inner ring 24 made of a suitable material such as steel or the like. I provide the inner ring 24 with a raceway or groove 26 and lands 28 and 30 extending axially outwardly from the edges of the groove 26 to the end faces 32 and 34 of the inner ring 24.

As is known in the art, rolling elements such as steel balls 36 are disposed in raceways 14 and 26 between the rings 12 and 24. In the prior art, in order to lubricate the bearing 10, it is customary to supply a suitable liquid lubricant such as oil to the raceways 14 and 26 to minimize the rolling friction between the balls 36 and the raceways. Owing to the fact that this lubricant wets the material of rings 12 and 24, it has a tendency in bearings of the prior art to creep outwardly along the surfaces of lands 16, 18, 28 and 30 and then radially along the surfaces of the end faces 20, 22, 32 and 34. As is pointed out hereinabove, this lubricant creep not only reduces the useful lubricant in the grooves 14 and 26, but also tends to collect dirt which may ultimately clog the bearing 10 or interfere with proper operation of other parts associated with the bearing 10.

My antilubricant creep bearing 10 includes means for inhibiting creep of liquid lubricant away from the raceways or grooves 14 and 26, thus to obviate the two resultant problems pointed out hereinabove. I provide the outer ring 12 with respective thin films 38 and 40 of material having low surface tension which is not wetted by liquid lubricant. One material which is eminently suited to my purpose of inhibiting creep or flow of lubricant outwardly over the lands 16 and 18 is tetrafluoroethylene copolymer. Each of the films 38 and 40 extends entirely around the ring 12 over the lands 16 and 18 from adjacent the edges of the groove 14 outwardly to the end faces 20 and 22 and thence radially outwardly along the end faces.

I provide the inner ring 24 with respective thin films 42 and 44 of an antistick material similar to that of which films 38 and 40 are formed and which is not wet by the liquid lubricant. Each of the films 42 and 44 extends entirely around the inner ring 24 from a location adjacent one edge of the groove 26, axially outwardly toward the end faces 32 and 34 and thence radially inwardly along the end face.

I may employ any suitable method for applying the films 38, 40, 42 and 44 to the rings 12 and 24. One method which I have found to be satisfactory is to rub the tetrafluoroethylene resin over the surfaces to be coated at a high enough pressure and with sufficient velocity to transfer the resin to the surface. In another method of applying the material, preferably I fill the resin with an abrasive which serves to roughen the surface so as to make it more receptive to transfer of the resin to the surface. I may employ any other method for coating the surfaces. For example, the rings might be cleaned and then dipped in a dispersion of tetrafluoroethylene while being vibrated. Next, the rings would be removed and dried while agitating them to prevent sticking and the material could then be fused. When the coatings are applied in this manner, either the resin must be removed from the grooves after curing, or else the grooves themselves might not be formed until after the rings have been coated. It will readily be appreciated that in addition to the two methods discussed, I might use any other suitable method for application of the films.

In use of my antilubricant creep bearing 10, after the parts of the bearing have been assembled and when the bearing is installed, liquid lubricant is introduced into the bearing so as to flow into the grooves or raceways 14 and 26, the surfaces of which are wet by the lubricant. The liquid lubricant would have a natural tendency to creep or flow outwardly along the surfaces of the lands 16, 18, 28 and 30 and thence along the end faces 20, 22, 32 and 34 of the bearing. However, owing to the presence of the films 38, 40, 42 and 44 which are formed of a material which is not wet by the lubricant, the tendency of the lubricant to creep out of the bearing is inhibited. Consequently, there will be no excessive loss of lubricant and the bearing will not tend to collect dust and dirt in the manner of bearings of the prior art.

It will be seen that I have accomplished the objects of my invention. I have provided a lubricant anticreep bearing which inhibits flow of lubricant out of the bearing. My bearing does not require as frequent replenishment of the supply of lubricant as do bearings of the prior art. It does not have the same tendency to collect dirt as do bearing assemblies of the prior art.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. A bearing assembly including in combination, an inner ring having end faces and a centrally located annular raceway and respective lands extending from said raceway toward said end faces, respective first and second thin films of lubricant anticreep material on said inner ring lands, each of said first and second films extending outwardly from starting locations on the corresponding lands adjacent to the edges of the inner ring raceway toward the corresponding end face to leave lubricant spaces on said inner ring lands at the edges of the inner ring raceway, an outer ring having end faces and a centrally located annular raceway and respective lands extending from said raceway toward said end faces, respective third and fourth thin films of lubricant anticreep material on said outer ring lands, third and fourth films extending outwardly from starting locations on the corresponding lands adjacent to the edges of the outer ring raceway toward the corresponding end faces to leave lubricant spaces on said outer ring lands at the edges of the outer ring raceways, and rolling elements between said rings in said raceways.

2. An assembly as in claim 1 in which said lubricant anticreep material is polytetrafluoroethylene.

3. An assembly as in claim 1 in which said films extend outwardly to said end faces and radially for a distance along the end faces.